April 19, 1960  G. F. SIEDOW  2,933,120
RUBBER VALVE
Filed March 19, 1958
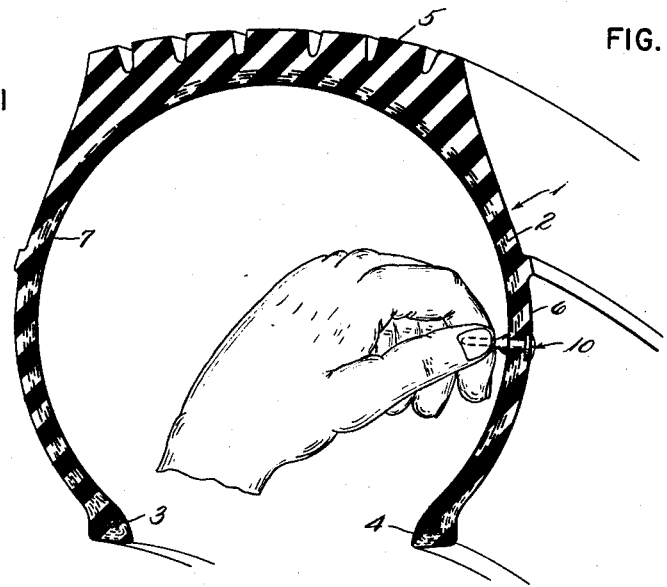
FIG. 1
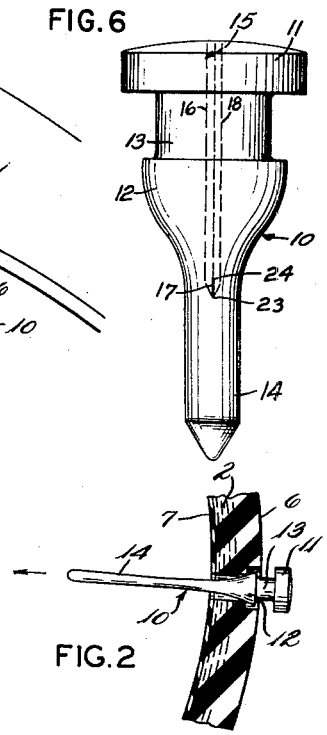
FIG. 6
FIG. 2
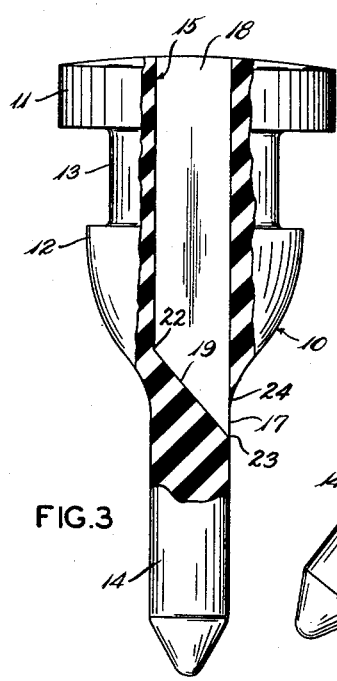
FIG. 3
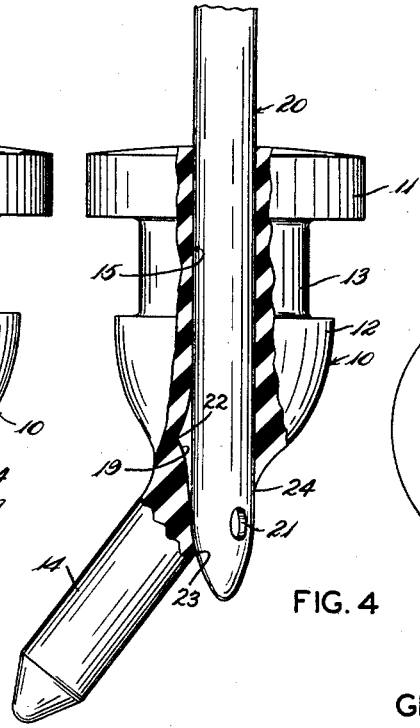
FIG. 4
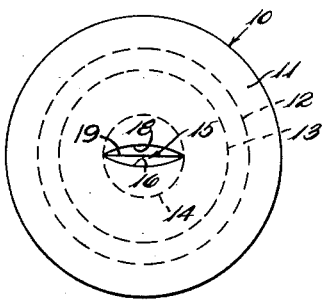
FIG. 5
INVENTOR.
GEORGE F. SIEDOW
BY
W. G. Fraser
ATTY.

United States Patent Office 2,933,120
Patented Apr. 19, 1960

2,933,120

RUBBER VALVE

George F. Siedow, Akron, Ohio, assignor to The Firestone Tire & Rubber Company, Akron, Ohio, a corporation of Ohio Application March 19, 1958, Serial No. 722,493

3 Claims. (Cl. 152—429)

This invention relates to valves for inflatable pneumatic containers and more particularly to a new valve for use in the sidewall of a tubeless tire.

For various reasons, a rubber inflation valve is used in the sidewall of tubeless tires together with or instead of the customary rim valve. In the manufacture of tubeless tires employing sidewall valves, it is customary to mold an annular hole in the sidewall of the tire through which the rubber valve may be thrust. This hole is made by forcing a shaped mandrel through the hot rubber of the sidewall, cord body and the inner liner of the tire to make a passage between the inside and the outside of the tire as the tire is vulcanized.

A rubber plug having an inflation passage is inserted into the opening in the tire and provides means for inflating the tire through the sidewall. To accomplish the inflation, a needle attached to an air hose is pushed through the passage, and air is discharged into the tire. When the needle is withdrawn the walls of the passage, being under compression, close to prevent the escape of air from the tire. Because the valve plug is provided with a shank protruding for some distance into the air cavity, the inflation passage provided by the prior art branched into a Y-shape to form two passages terminating in two openings in the side of the shank. This configuration, although desirable for other reasons, tended to obstruct the inflation needle when it was pushed into the valve tearing the valve and was unsatisfactory for various reasons.

The present invention overcomes the disadvantages of the prior art by providing a valve having a novel inflation tunnel free from obstructions in the sidewall of the tire.

It is an object of the invention to provide an improved rubber valve. It is a further object of the invention to provide an improved tubeless tire sidewall valve. Yet a further object of the invention is to provide a rubber valve having an air passage in the form of a tunnel having one closed end with a slit in the tunnel wall adjacent that end.

These and other objects of the invention will be more readily understood with reference to the specification, claims and drawings of which:

Fig. 1 is a perspective view, partially in section, showing a tubeless tire incorporating the invention.

Fig. 2 is a fragmentary sectional view of a portion of a tubeless tire wall being assembled with a rubber sidewall valve of the invention.

Fig. 3 is a side view, partially broken away in section, of the preferred form of the invention.

Fig. 4 is a side view of the rubber valve of the invention with an inflation needle inserted therethrough.

Fig. 5 is an end view of the rubber valve of the invention as viewed from outside the tire.

Fig. 6 is a view of the valve of Fig. 3 looking from the right-hand side.

Referring to Fig. 1 a tubeless tire generally indicated at 1 is comprised of a rubberized fabric body portion 2 terminating at each edge in annular beads 3 and 4 and capped with rubber tread portion 5 superimposed and bonded as by vulcanization thereto. The tread portion extends down the outside of the tire forming sidewall 6 while the inner peripheral surface of the inside of the tire is covered with a rubbery inner liner portion 7. The tire beads 3 and 4 normally are mounted on rim flanges not shown and provision is made for inflation of the tire in view of invention through sidewall inflation valve 10. Valve 10 may supplement inflation through the conventional rim valve or may be the sole means of tire inflation.

The sidewall valve of the invention generally indicated at 10 is comprised of outer flange 11 and inner flange 12 separated by column 13 merging into shank 14. For the inflation of the tire an air passage 15 pierces the plug from the outer surface of the outer flange through column 13, inner flange 12 to communicate with the outside of the shank 14. The plug is thrust into the molded hole in the sidewall of the tire, Fig. 2, and pulled therethrough by grasping the shank 14 and pulling inwardly with respect to the tire wall until the plug attains the position shown in Fig. 1. The diameter of the outer flange 11 is greater than its seat in the sidewall of the tire, while the diameter of the column 13 is greater than the diameter of its seat in the fabric body portion of the tire. Also, the longitudinal extent of the column 13 is less than the thickness of the sidewall of the tire so that when the plug is pulled through the tire the column 13 will be extended or placed under tension with the result that outer flange 11 will be urged into its seat in the sidewall. When the shank 14 is released tension is released on the plug and the column 13 will tend to contract to its original height with the result that the outer and inner flanges, 11 and 12 respectively, will be put under compression against the outer and inner surfaces of the tire respectively. The diameter of column 13 in the position attained when seated is still greater than the diameter of the hole in which it is seated. Consequently, the column of the plug is also under radial compression. The result is that there is a seal around the peripheral surface of the flange 11 as well as on the inner face of that flange. A further seal is attained around the peripheral surface of the column 13 against the tire fabric body portion 2 while the flange 12 is under compression to bring its flat surface into sealing contact against the surface of the inner liner 7.

Referring to Fig. 4, a hollow inflation needle 20, provided with an air outlet orifice 21 on its innermost end is shown inserted through passage 15 of valve 10 and extended through a slit 17 in the side of the valve to communicate with the pneumatic chamber of the tire. Air under pressure is introduced through the needle to inflate the tire. It will be noted that needle 21, when pushed down the passage of valve 10, displaces shank 14 as it contacts the base of the orifice. Because there is only one direction in which the needle can go, there is no hanging up of the needle in the passage to tear the valve. After air has been forced into the tire to the desired pressure, the needle is removed and the shank 14 returns to its original position (Fig. 3) while slit 17, because of the normal resiliency of the valve rubber, closes to seal air in the tire.

Passage 15 of this invention is a closed-end tunnel defined by walls 16 and 18 which, in the lower part of the passage, curve toward each other and blend together along the sloping line 19, beginning at a point 22 and ending at a point 23 (see Figs. 3, 5 and 6). Slit 17, which extends upward from point 23 to a point 24, lies in the median plane passing through the vertical intersections of walls 16 and 18.

To guide the inflation needle through slit 17 and prevent it "hanging up" in the valve, the converging walls 16 and 18 taper from point 22 to point 23 at slit 17. These converging walls in effect form the end of the tunnel since slit 17 does not open from the end but from the side wall of the tunnel.

Although one form of the invention has been described by way of illustration, those skilled in the art will recognize that modification may be made within the scope of the following claims.

I claim:

1. A rubber valve of the character described comprised of a flange-shaped seat portion at one end, a second flange-shaped seat portion spaced from said first-named seat portion, a seat portion intermediate said flange seat portions of less peripheral extent than and merging with each said flange-shaped seat portions, a shank protruding from and merging with said second-named seat portion, walls defining a tunnel extending through said seat portions and partially into said shank, said tunnel having an opening in said first flange portion, a second opening in the outside surface of said shank portion and also in the side of said tunnel, the end of said tunnel in said shank comprising at least one wall sloping laterally across the tunnel, and said opening in said shank having one segment of its peripheral edge merging with said sloping wall.

2. A rubber valve of the character described comprised of a flange-shaped seat portion at one end, a second flange-shaped seat portion spaced from said first-named seat portion, a seat portion intermediate said flange seat portions of less peripheral extent than and merging with each said flange-shaped seat portions, a shank protruding from and merging with said second-named seat portion, walls defining a tunnel extending through said seat portions and partially into said shank, said tunnel having an opening in said first flange portion, a second opening in the outside surface of said shank portion and also in the side of said tunnel, said walls converging in the shank end of said tunnel and merging along a line sloping laterally across the tunnel, and said opening in said shank having one segment of its peripheral edge merging with said sloping line.

3. A rubber valve of the character described comprised of a flange-shaped seat portion at one end, a second flange-shaped seat portion spaced from said first-named seat portion, a seat portion intermediate said flange seat portions of less peripheral extent than and merging with each said flange-shaped seat portions, a shank protruding from and merging with said second-named seat portion, walls defining a tunnel extending through said seat portions and partially into said shank, said tunnel having an opening in said first flange portion, a second opening in the outside surface of said shank portion and also in the side of said tunnel, the shank end of said tunnel sloping laterally across the tunnel, and said opening in said shank having one segment of its peripheral edge merging with said sloping end.

References Cited in the file of this patent

UNITED STATES PATENTS

| | | |
|---|---|---|
| 670,725 | Pickett | Mar. 26, 1901 |
| 1,630,040 | Vogt et al. | May 24, 1927 |
| 1,990,374 | Goldsmith | Feb. 5, 1935 |
| 2,634,785 | Tubbs | Apr. 14, 1953 |